(12) United States Patent
Traitel

(10) Patent No.: US 12,229,814 B2
(45) Date of Patent: Feb. 18, 2025

(54) SYSTEMS AND METHODS TO ESTABLISH ANONYMOUS AND PRIVATE COMMUNICATION CONNECTING WITH NFC CODES, QR CODES, AND/OR ALPHANUMERIC COMPUTER-GENERATED CODES INCLUDING ITEM LISTINGS FOR SALE AND/OR SERVICES

(71) Applicant: TraiTel Telecommunications Corporation, San Diego, CA (US)

(72) Inventor: Eli Traitel, San Diego, CA (US)

(73) Assignee: TraiTel Telecommunications Corporation

( * ) Notice: Subject to any disclaimer, the term of this patent is extended or adjusted under 35 U.S.C. 154(b) by 0 days.

(21) Appl. No.: 18/616,101

(22) Filed: Mar. 25, 2024

(65) Prior Publication Data

US 2024/0320726 A1  Sep. 26, 2024

Related U.S. Application Data

(60) Provisional application No. 63/499,510, filed on May 2, 2023, provisional application No. 63/492,223, filed on Mar. 25, 2023.

(51) Int. Cl.
| | | |
|---|---|---|
| G06Q 30/00 | (2023.01) | |
| G06K 19/06 | (2006.01) | |
| G06K 19/07 | (2006.01) | |
| G06K 19/077 | (2006.01) | |
| G06Q 30/0601 | (2023.01) | |

(52) U.S. Cl.
CPC ..... *G06Q 30/0625* (2013.01); *G06K 19/06037* (2013.01); *G06K 19/0723* (2013.01); *G06K 19/07758* (2013.01)

(58) Field of Classification Search
None
See application file for complete search history.

(56) References Cited

U.S. PATENT DOCUMENTS

| | | | |
|---|---|---|---|
| 9,276,921 B2 | 3/2016 | Birkler et al. | |
| 11,308,480 B2 | 4/2022 | Gosalia | |
| 11,328,294 B2 | 5/2022 | Foster, Jr. | |
| 2013/0144962 A1* | 6/2013 | Turner | G06F 15/16 709/206 |
| 2014/0119531 A1* | 5/2014 | Tuchman | H04M 7/003 379/265.09 |
| 2023/0017090 A1* | 1/2023 | Doumar | G06F 21/31 |

FOREIGN PATENT DOCUMENTS

WO        2015039025 A1    3/2015

* cited by examiner

*Primary Examiner* — Mila Airapetian

(57) ABSTRACT

A mobile device based messaging application that allows users to communicate anonymously and privately. Users can scan a QR (Quick Response) code or read a NFC (Near-Field Communication) chip in a combination QR/NFC tag, or use a computer-generated code to initiate a conversation. The conversations are automatically generated and populated with the appropriate information. Once the user terminates a conversation, the other party cannot communicate with the user. If desired, the user can re-scan the tag or enter the unique code to create a new conversation.

16 Claims, 5 Drawing Sheets

SYSTEMS AND METHODS TO ESTABLISH ANONYMOUS AND PRIVATE COMMUNICATION CONNECTING WITH NFC CODES, QR CODES, AND/OR ALPHANUMERIC COMPUTER-GENERATED CODES INCLUDING ITEM LISTINGS FOR SALE AND/OR SERVICES

CROSS-REFERENCE TO RELATED APPLICATIONS

This application claims priority to U.S. Provisional Patent Application Nos. 63/492,223, filed Mar. 25, 2023, and 63/499,510, filed May 2, 2023, the entirety of which are incorporated by reference.

TECHNICAL FIELD

The technical field of the disclosed embodiments relate to automatically initiating anonymous and private communications in a chat messaging system based on a code. More particularly. the disclosed embodiments relate to a smart device based application that can be used to initiate anonymous and private communications in response to scanning a QR (Quick Response) code, reading a code from an NFC (Near-Field Communication) chip, or entering a computer-generated alphanumeric code associated with an item or a person.

BACKGROUND

QR (Quick Response) and NFC (Near-Field Communication) codes are versatile tools that can be used in a variety of applications. For example, they can be used to track inventory, promote sales and marketing campaigns, initiate and authenticate communications. and provide consumers with information regarding goods and services.

The following documents describe exemplary systems that use QR. NFC and/or other machine-readable codes:
   U.S. Pat. No. 9,276,921B2 ("System And Method For Establishing Communication Session")
   WO2015039025A1 ("Methods And Systems For Using Scannable Codes To Obtain Scan Triggered Services")
   U.S. Pat. No. 11,328,294B2 ("Anonymous Peer-To-Peer Near-Field Communication System")
   U.S. Pat. No. 11,308,480B2 ("Anonymizing User Identity Via Machine-Readable Codes").

SUMMARY

In an embodiment, a system allows users to create and share item listings with other users and automatically initiate chat conversations based on scanning a tag that is attached to the item and contains a QR (Quick Response) code and/or an NFC (Near-Field Communication) chip.

The QR code and/or NFC chip can be scanned/read by a user's device to view the listing, and automatically initiate an anonymous conversation with the item's owner. The system also includes a server that stores information about the listings. such as a description of the item, photos, etc.

The system is designed to provide anonymous and private communications. Users can choose to share their contact information with other users or to remain anonymous. Any user can terminate a conversations, e.g., by deleting the conversation or blocking the other party, at any time. Information regarding the conversation can also be deleted from a party's device by deleting the conversation.

The system also provides for automatically initiating anonymous and private chat conversations regarding an item or service by entering a computer-generated QR code associated with the item or service. Users can also initiate anonymous and private chat conversations not related to an item or service in response to scanning a QR code associated with another user or group of users or by entering a computer-generated alphanumeric code associated with another user or group of users.

DETAILED DESCRIPTION

A system according to an embodiment upgrades existing chat messaging applications by integrating Quick Response (QR) codes, Near-Field Communication (NFC) chips and/or computer-generated alphanumeric codes to automatically initiate anonymous and private conversations.

In an embodiment. a user may download a chat messaging application ("app") compatible with the system onto their mobile (smart) device, e.g., through an app store such as Google Play or Apple's iOS app store, depending on the operating system. Upon installing the app, the user may be prompted to create an identifier, e.g., a user name, they want to display to other parties using the app. The user may opt to use their own name or may use a pseudonym for anonymous and private messaging. The user may also enter private information. such as a phone number, email address. birth details, location, address. etc. Addition of such personal information is at the discretion of the user, and the user can choose to enter the details they are comfortable in sharing with other parties.

In an embodiment, a user may have more than one profile. For example, a user may have a personal profile including personal information, an anonymous profile only including a name (or pseudonym), or a business profile linked to an employer's account, which also provides a degree of anonymity as the business profile may include detailed information about the business but only the employee's name (or pseudonym). The different profiles may be accessed by selecting different modes or "tabs" in the graphical user interface (GUI) provided by the app.

The chat messaging app may be, for example, the SiMP app, a secure messaging app developed by TraiTel Telecommunications Corp. It allows users to send and receive text messages. photos, videos, and files in a secure and private way. SiMP also includes user features such as group messaging, (voice) chat. and location sharing, and security features such as end-to-end encryption. two-factor authentication, and device verification.

In an embodiment, the app may be used to provide a secure and convenient way to conduct business, for example, by enabling sellers and buyers of goods and services to share information regarding the goods/services while ensuring the privacy and anonymity of both parties by allowing them to communicate without revealing their personal information.

Figure 1:
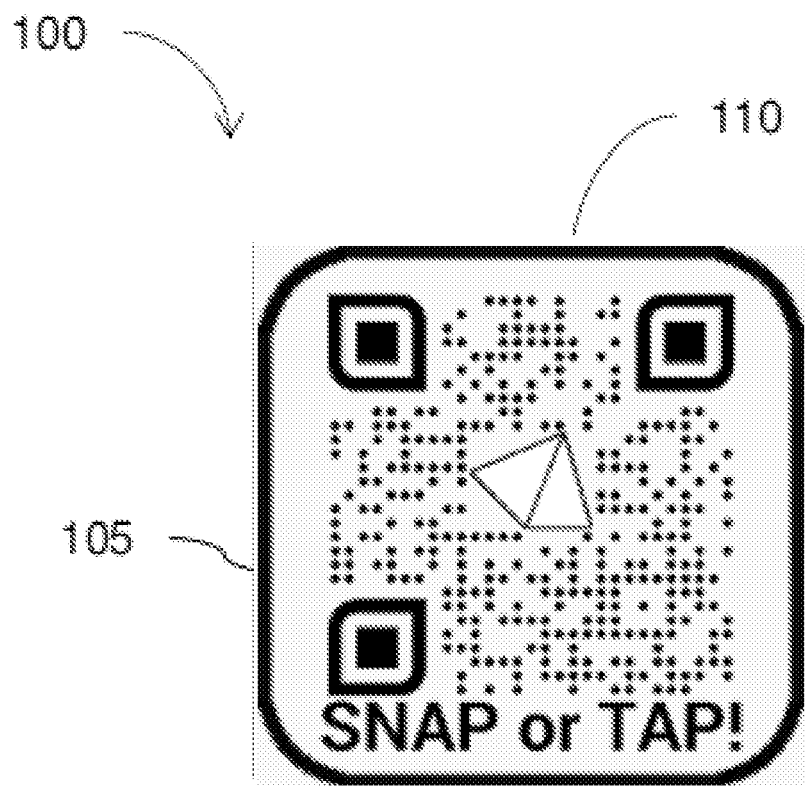
FIG. 1 is a plan view of a tag including a QR (Quick Response) code and an NFC (Near-Field Communication) chip according to an embodiment.
Figure 2:
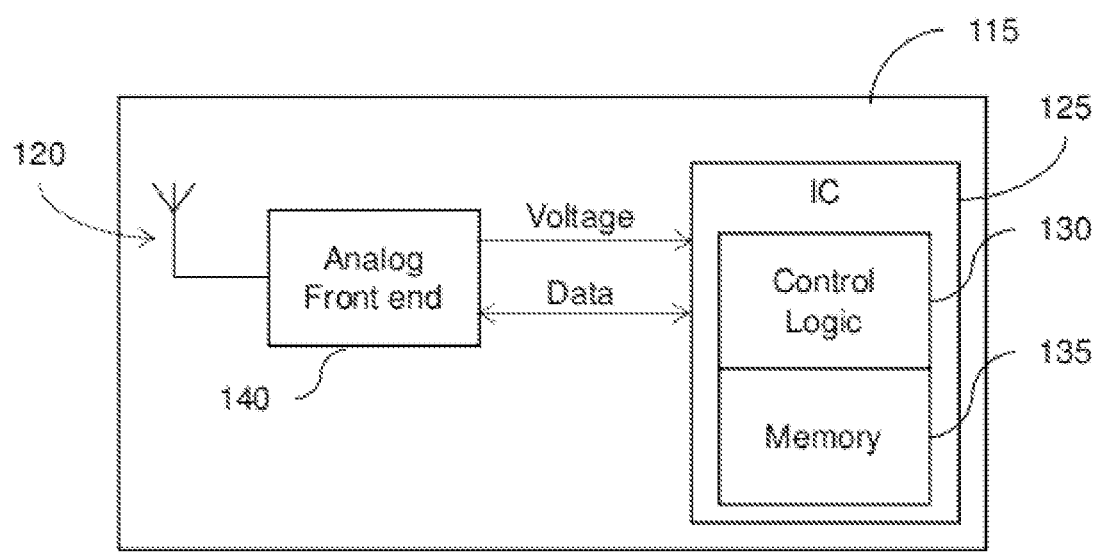
FIG. 2 is a block diagram of the NFC chip of FIG. 1.

The app may be compatible with a combination QR/NFC tag 100, as shown in FIGS. 1 and 2. The tag 100 may be physically associated with an item for sale by being laid on or near the item or attached to the item. The QR code on the tag surface and NFC chip in the tag include information identifying the tag itself. The tag identifying information may be linked to data in the system regarding the item. such as the item's description, images), price. and availability.

As shown in FIG. 1. the top surface 105 of the tag 100 has a visible QR code 110. In an embodiment. the tag 100 is about 30 mm square with the QR code printed on both sides (top/bottom) of the tag. The tag may include a plastic housing, but other suitable materials are contemplated, e.g., metals, ceramics, plant-based materials, etc.

The tag 100 includes an internal NFC chip 115, as shown in FIG. 2. The NFC chip may include an antenna 120, an IC (integrated circuit) 125 including control logic 130 and a ROM (Read-Only Memory) 135, and an analog front end 140. The analog front end 140 generates power (voltage) for the IC 125 from signals received from an NFC reader (e.g., the user's smartphone) and converts analog signals to-and-from digital signals to enable communication between the NFC reader and the IC 125 via the antenna 120. The analog front end 140 may include, For example, a power generating circuit, coil, capacitor, modulator/demodulator, etc. The NFC chip 115 may comply with the IOS/TEC (International Organization for Standardization/International Electrotechnical Commission) 18092 standard for NFC communication.

Figure 3:
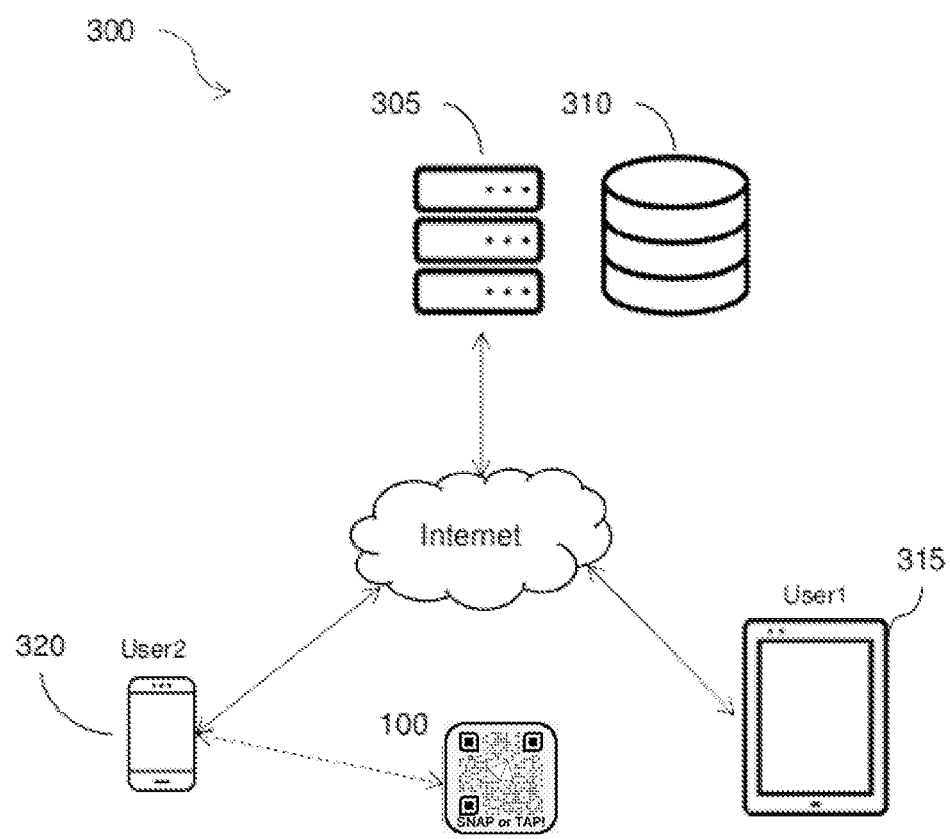
FIG. 3 is a diagram of a chat messaging system according to an embodiment.

FIG. 3 shows a chat messaging system 300 supporting the use of QR/NFC tags 100 according to an embodiment. The system 300 includes a system server 305 and database 310. The server 305 includes, among other components, a processor. a non-transitory memory including processor-readable instructions, and a network interface.

System server(s) 305 manage messages between users, in this scenario, User1 315 and User2 320. Messages sent by the users are first sent to the system servers. and then forwarded to the recipient's device. If the recipient is offline, the message is stored on a server database 310 to be delivered to the recipient's device when they come back online. The system 300 may use end-to-end encryption to protect user messages.

Figure 4A:
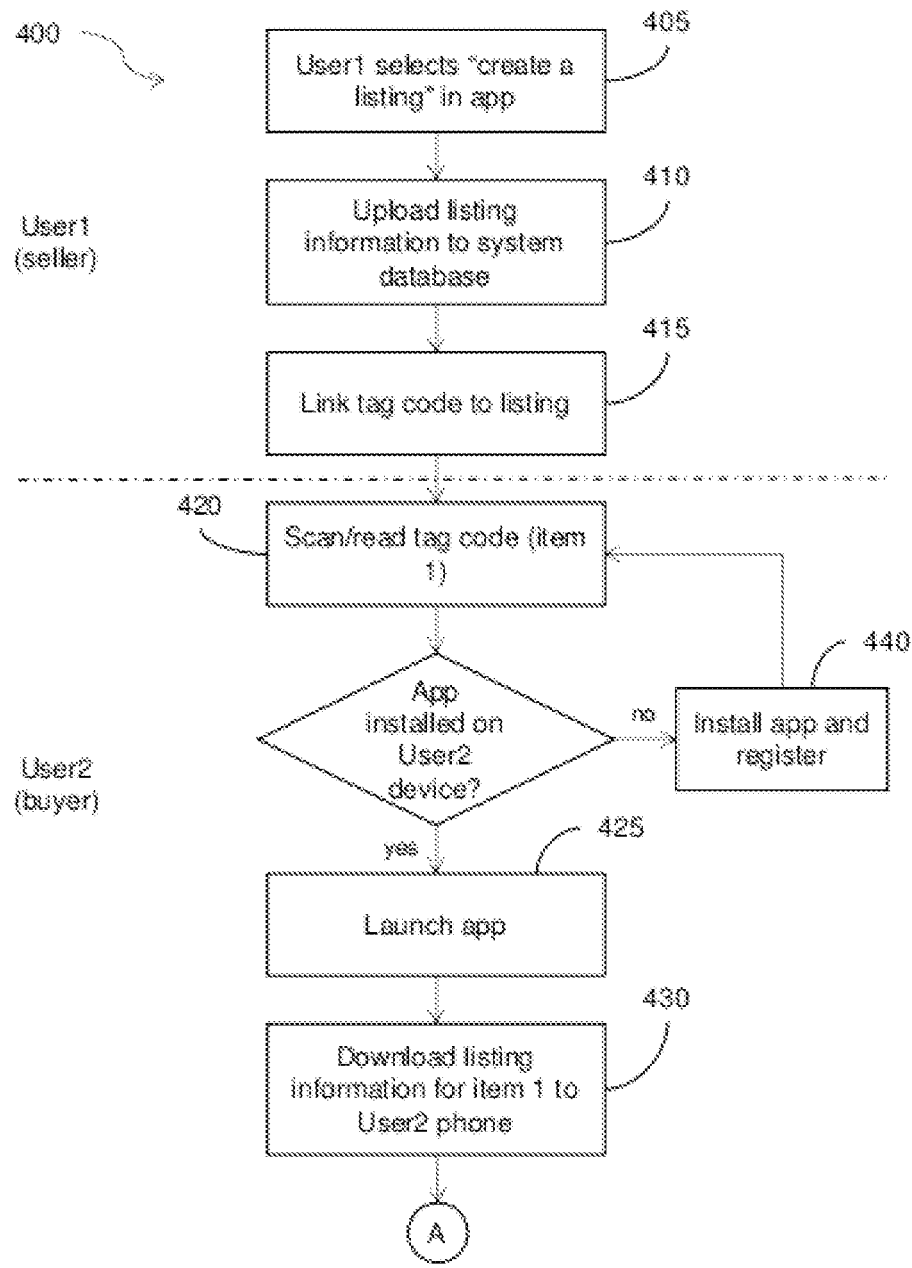
FIGS. 4A and 4B are flowcharts describing an operation for automatically initiating a chat messaging conversation in response to a code according to an embodiment.
Figure 4B:
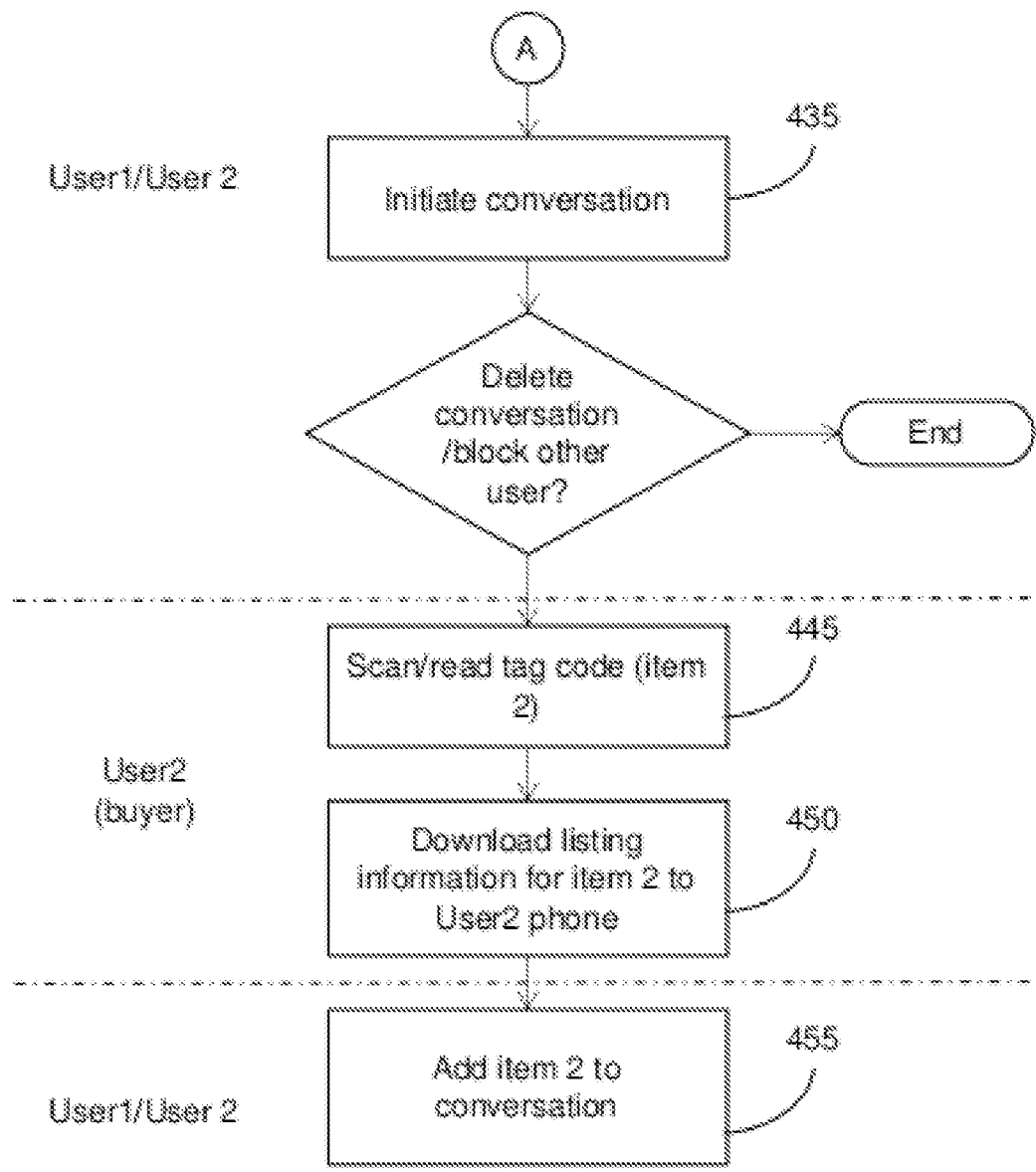

FIG. 4 shows a chat messaging operation 400 using a combination QR/NFC tag 100. according to an embodiment. In an exemplary use case, a seller uses the tag 100 to sell an item. For example, the seller may be a merchant who owns a furniture store, and the item may be a couch. In this scenario. the merchant (User1) selects a "create a listing" option in the app (block 405). The merchant selects an item (i.e., the couch) and adds a description of the couch to the listing (block 410). which is stored at the system database 310. The merchant can also take photos of the couch and upload them to the listing in the app, as well as any other information they deem relevant. such as price, location in the store. etc.

Once the listing is created. the merchant can "link" a code for the tag 100 to the listing (block 415) and place or attach the tag somewhere on or near the couch visible to customers.

When a customer (User2) walks into the store and sees the couch. the tag 100 will be readily apparent. If the customer is interested in the couch, the user may use their phone's camera to scan the QR code 110 or place the phone within range of the NFC chip 115 to read the NFC code (block 420). The QR code on the tag and NFC code in the chip may be associated with the chat messaging app. e.g., by linking to a domain name or URL specific to the app.

If the customer has the app installed on their phone, the app will recognize the code and launch the app on the user's phone (block 425). All information associated with the listing for the couch may be automatically downloaded to the user's phone (block 430), and a new chat conversation with the merchant automatically initiated (block 435).

If the customer does not have the app installed when trying to read or scan the code. the user may be prompted to download and install the app (block 440). During registration, the user can enter as little or as much personal information they want, including only supplying a pseudonym for anonymous and private communication. The operation may then proceed as described in block 425.

When a customer opens a conversation with a merchant, they can read and see all information associated with the listing. They can also start a chat. make a VoIP call. or use any other communication option available on the app. The app will also open a new conversation on the merchant side. However. the merchant will only have the information the customer chose to supply during registration.

If the transaction concludes or if at any time either party is no longer interested in the transaction, either party can terminate the conversation by, for example, deleting the conversation or blocking the other party from future communications. In the event the conversation is deleted, all information regarding the user that deleted the conversation will be deleted from that user's device. The chat conversation may remain in the other party's app, but the only information regarding the user who deleted the conversation will be the user's name selected during registration.

From the customer's perspective. this anonymous aspect eliminates the possibility of spam emails, robocalls, unwanted callbacks, etc. For example, even if the customer deletes the original conversation. the customer can initiate a new. anonymous conversation merely by re-scanning the tag 100, provided the merchant hasn't blocked the customer. From the merchant's side, when the customer re-scans the tag, the previous conversation will resume.

Customers can also add to the conversation by scanning other items in the store (block 445). The listing details for every new item will be downloaded to the customer's phone (block 450) and go under the same conversation (block 455). For example, if the conversation is called "ACME Furniture," and the customer scans the tags of a couch and then a table, the description and photos of both items will be displayed in the conversation.

Customers can also start different conversations in different stores. For example, if the customer goes to ABC Furniture, they can start a new conversation called "ABC Furniture" by scanning the tags of, for example, couches, tables, and/or other items offered by that merchant.

In an embodiment, the tags are pre-programmed with a QR code and NFC code that are linked to the app. Users can change the associations of the codes to point to any listing at any time. In this manner. the codes are dynamic and can be associated with different items at the user's discretion. For example. if a user sells the item that the tag was originally associated with. they can simply pair the tag with a new item or service. The QR code and NFC code will then immediately point to the new listing.

It is important to note that the tag itself is not being re-programmed. The QR code is printed and fixed, and the NFC is write-protected. Instead, the app is using the code of the tag (say X1234Y) and associating it to a new listing. This means that a tag can be used indefinitely as long as the tag is not damaged.

The app allows users to create listings for any item or service they want to sell, whether they are a merchant or an individual. For example, to sell a car or even a house with the app. the user can create a listing on the app and add a description. photos. price. etc. They can then place a tag in the car window or affix it to a real estate sign in their yard. When a potential buyer scans the tag. they will see all of the information about the item for sale and start a conversation with the user. The user can then chat with the buyer to answer any questions they may have and make arrangements for the sale while protecting the privacy and personal information of both the buyer and the seller.

In the examples described above. the tag carries the QR code and NFC code and is physically associated with an item. In an alternative embodiment. a unique alphanumeric code can be generated for a listing and used to create a link between two parties in the same way as described for the tag. The code can be, for example. six characters long and be associated with a class of item or service. For instance some exemplary code associations are, Florist HDPYCR; Table top BMBZDG; Furniture FZ636P; Appliance EMRSXB; Motor Bike NGBSI-IX; Bicycle NZJFSR; Real Estate WVX62R.

As used herein, the term "alphanumeric code" refers to any code that includes letters and numbers. The alphanumeric code may consist of a mix of letters and numbers, all letters. or all numbers.

In one scenario, a user may post an item for sale on a classified advertising website such as Craigslist®. In addition to adding a description and photos of the item, the user could use the unique alphanumeric code in the contact field for the listing. A person interested in the item (buyer) could enter the alphanumeric code in the app installed on their smart device, and the app would automatically download the description and photos of the item and initiate a conversation between that person and the user (seller). The alphanumeric codes can be used to create an anonymous connection between the buyer and seller without having to exchange personal information. thereby protecting the privacy of both parties. They can be deleted by either party at any time as in the examples described above.

In an embodiment. a QR code associated with a user or alphanumeric code can be used to connect users with each other anonymously. Users can scan each other's QR codes as displayed on the screen of their device or type in unique one-time codes to create a new conversation. All that is visible to each user is the name that the other user has chosen to share. This makes the chat messaging system a safe and private way to communicate, especially for people who are concerned about harassment or privacy. Any user can terminate the conversation, e.g., delete the conversation or block user(s) in the conversation, at any time without fear of disclosing personal and private information.

The foregoing method descriptions and figures are provided as illustrative examples only. The order of operations in the aspects described herein may be performed in any order. Words such as "thereafter." "then." "next." etc. are used to guide the reader through the description of the methods and systems described herein, and do not limit the order of the operations. Further, any reference to claim elements in the singular, for example using the articles "an," or "the" is not to be construed as limiting the element to the singular. Also. relative terms such as "top," "bottom." "upper," "lower," "above," "below," and the like as used herein describe the relative positions of elements or features. and are not limited to the orientations depicted in the drawings.

The components, blocks, modules, circuits, operations, etc. described may be implemented in hardware, software, firmware, or any combination thereof. Hardware implementation may include, for example. one or more application-specific integrated circuits (ASICs), field-programmable gate arrays (FPGAs). or other programmable logic devices. Software implementation may include, for example, one or more computer programs, firmware, or other executable code. Firmware implementation may include, for example, one or more programs or code that is stored in a non-volatile memory, such as a read-only memory (ROM), a flash memory, or an erasable programmable read-only memory (EPROM).

If implemented in software, the operations may be stored as one or more instructions (or code) on a non-transitory computer-readable storage medium or a non-transitory processor-readable storage medium. A non-transitory computer-readable storage medium may include, for example. a hard disk drive, a solid state drive, a flash memory, a memory card, a CD-ROM, a DVD, etc.

The operations of a method or algorithm disclosed herein may be embodied in a processor-executable software module or as processor-executable instructions. both of which may reside on a non-transitory computer-readable or processor-readable storage medium. A processor-executable software module may include, for example, a computer program. firmware, or other executable code that is executed by a processor. Processor-executable instructions may include, for example, one or more instructions that are executed by a processor.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the specific embodiments described herein but is to be accorded the widest scope consistent with the claims.

The invention claimed is:

1. A system comprising:
 a reusable physical tag that is attachable and detachable to a product including
  a housing with a first side including a quick response (QR) code corresponding to a tag code identifying the tag, and
  a near-field communication (NFC) chip including a memory storing a code corresponding to the tag code;
 a first user device;
 a second user device including at least one of a QR code scanner and an NFC chip reader; and
 a server including
  a processor,
  a database containing information associated with the product and an item listing for said product received from the first user device and linked to the tag code, and
  a non-transitory memory storing instructions that, when executed by the processor, cause the processor to
   receive the tag code from the second user device,
   transmit information associated with the item listing to the second user device, and initiate an anonymous chat conversation between the first user device and the second user device using a dedicated chat application operative to initiate a private, secure, and anonymous chat based on at least one of an NFC tag code, QR code, and/or an alphanumeric code.

2. The system of claim 1, wherein the information associated with the item listing includes a textual description of the item.

3. The system of claim 1, wherein the information associated with the item listing includes an image of the item.

4. The system of claim 1, wherein the memory further stores instructions that, when executed by the processor, cause the processor to terminate the chat conversation in response to receiving a termination command from one of the first user device and the second user device.

5. The system of claim 4, wherein the instructions that cause the processor to terminate the chat conversation include instructions that, when executed by the processor, cause the processor delete the conversation from at least the user device that issued the termination command.

6. The system of claim 4, wherein the instructions that cause the processor to terminate the chat conversation include instructions that, when executed by the processor, cause the processor to block further communication to the user device that issued the termination command from the other user device.

7. The system of claim 1, wherein the memory further stores instructions that, when executed by the processor, cause the processor to link the tag code to a new item listing.

8. The system of claim 1, wherein the second user device includes a processor operative to generate the tag code from scanning a QR code.

9. The system of claim 1, wherein the second user device includes a processor operative to generate the tag code from reading an NFC chip.

10. The system of claim 1, wherein the second user device includes a processor operative to generate the tag code from an alphanumeric code.

11. A non-transitory computer-readable medium having stored thereon computer-readable instructions, which when executed, cause at least one processor to:

receive information associated with an item listing received from a first user device linked to a tag code;

receive the tag code from a second user device including at least one of a QR code scanner and an NFC chip reader from a reusable physical tag that is attachable and detachable to a product;

transmit information associated with an item listing associated with the product to the second user device; and initiate an anonymous chat conversation between the first user device and the second user device using a dedicated chat application operative to initiate a private, secure, and anonymous chat based on at least one of an NFC tag code, QR code, and/or an alphanumeric code.

12. The computer-readable medium of claim 11, wherein the information associated with the item listing includes a textual description of the item.

13. The computer-readable medium of claim 11, wherein the information associated with the item listing includes an image of the item.

14. The computer-readable medium of claim 11, further comprising instructions that, when executed by the processor, cause the processor to terminate the chat conversation in response to receiving a termination command from one of the first user device and the second user device.

15. The computer-readable medium of claim 11, further comprising instructions that, when executed by the processor, cause the processor to link the tag code to a new item listing.

16. The system of claim 1, wherein the instructions to cause the processor to initiate an anonymous chat conversation between the first user device and the second user device further comprise additional instructions operative cause the processor to automatically initiate a private, secure, and anonymous chat based on at least one of an NFC tag code, QR code, and/or an alphanumeric code and transmit to the second user device at least one of the item's description, images, price, and availability.

* * * * *